United States Patent
Verhoff

[11] 3,893,689
[45] July 8, 1975

[54] AUXILIARY WHEEL ATTACHING MEANS

[76] Inventor: Leonard J. Verhoff, R.R. No. 2, Box No. 150, Continental, Ohio 45831

[22] Filed: Apr. 16, 1968

[21] Appl. No.: 721,737

[52] U.S. Cl............................. 301/39 R; 301/37 C
[51] Int. Cl................................................ B60b 11/06
[58] Field of Search............... 301/36, 39, 38, 39 C; 24/68 T, 68 CT, 68 CD

[56] References Cited
UNITED STATES PATENTS

| | | | |
|---|---|---|---|
| 1,012,367 | 12/1911 | Kindscherf | 301/39 C |
| 1,327,607 | 1/1920 | Baker | 301/39 RC |
| 1,510,035 | 9/1924 | Bradley | 24/68 CT |
| 2,466,575 | 4/1949 | Burchett | 24/68 CT |
| 3,082,040 | 3/1963 | Degerness | 301/39 |
| 3,225,455 | 12/1965 | Hammer | 301/39 |
| 3,237,992 | 3/1966 | Kiesau | 301/39 |
| 3,328,088 | 6/1967 | Olson | 301/39 |
| 3,337,270 | 8/1967 | Peterson | 301/36 |
| 3,532,383 | 10/1970 | Unverferth | 301/39 R X |

FOREIGN PATENTS OR APPLICATIONS

| | | | |
|---|---|---|---|
| 402,261 | 1909 | France | 301/39 RC |
| 411,455 | 6/1910 | France | 301/39 RC |

Primary Examiner—Philip Goodman

[57] ABSTRACT

An independent releasable clamp for securing an auxiliary wheel rim with a spacer ring to a vehicle wheel rim comprising a plurality of separate detachable rim connector clamps each having a longitudinally adjustable means, such as a toggle or threaded means, and a hook portion for engagement with the outer terminal rim of the auxiliary wheel. A second hook, secured to the separate adjustable clamp means is engageable with an eye nut fixedly mounted to the vehicle wheel, so that the only alignment that need be made is that of the rim connector clamp with the eye bolt and not of the auxiliary wheel with the vehicle wheel.

13 Claims, 9 Drawing Figures

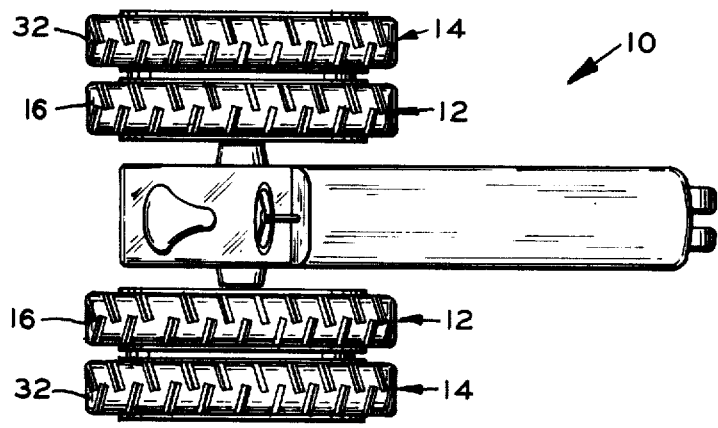
FIG. 1
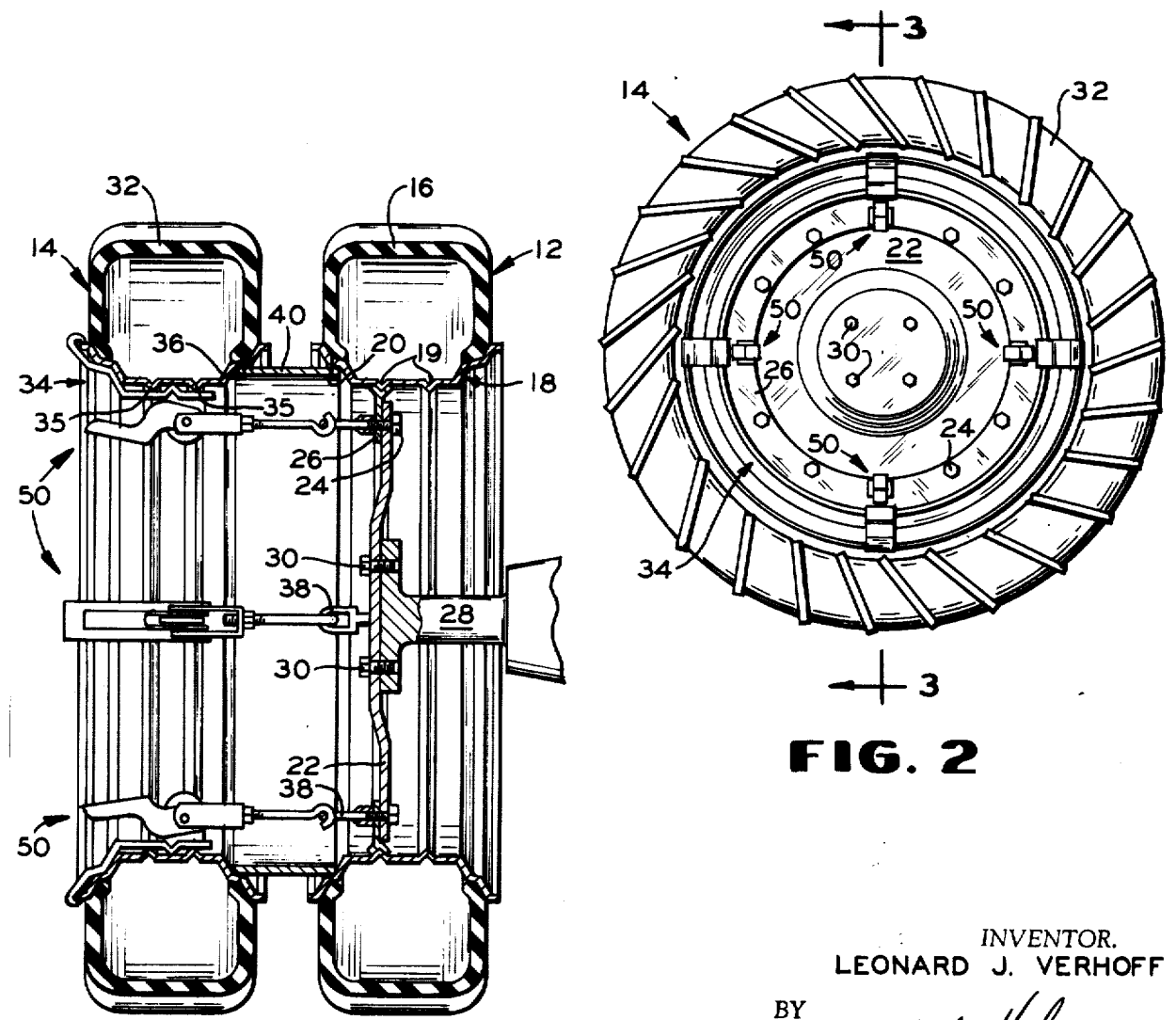
FIG. 3
FIG. 2
INVENTOR.
LEONARD J. VERHOFF
BY
*Hugh A Kirk*
ATTORNEY

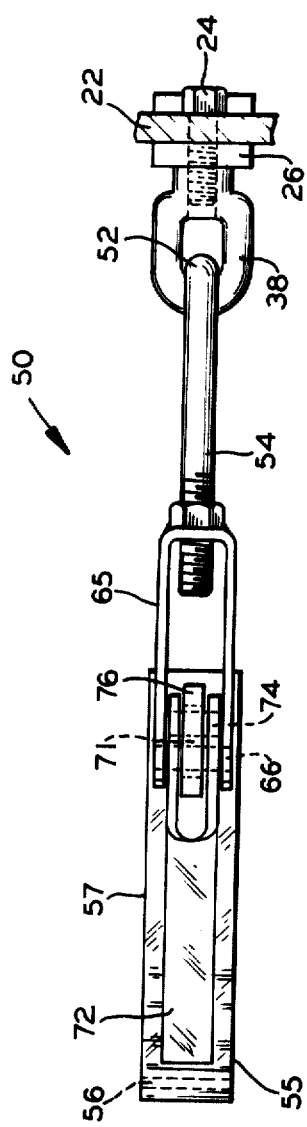
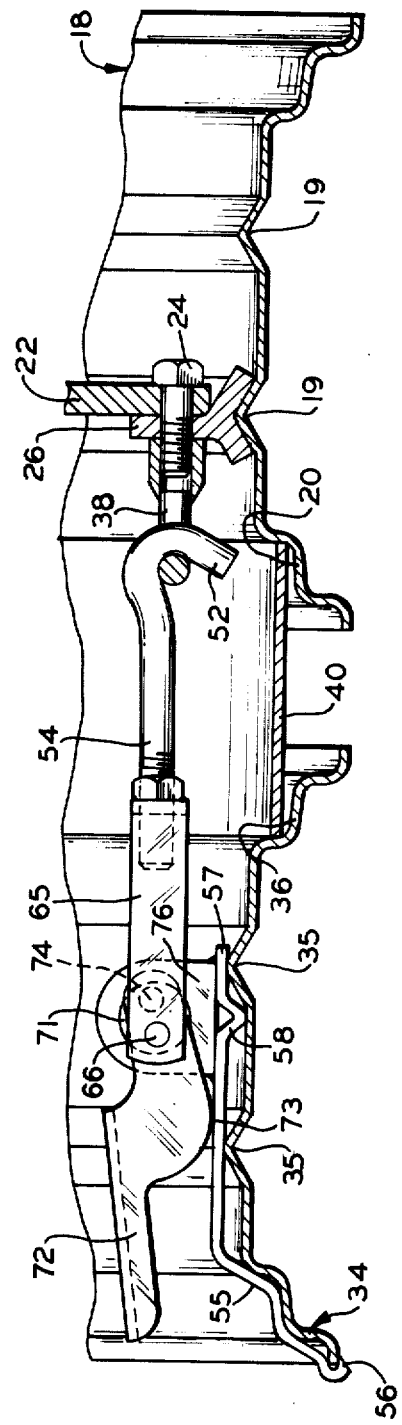

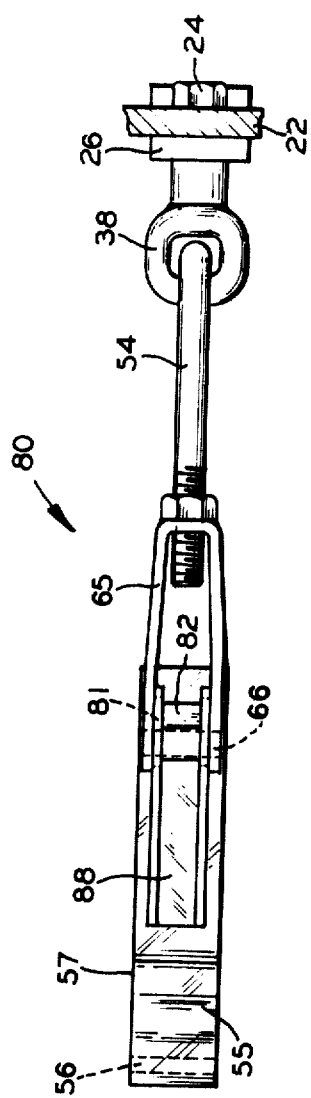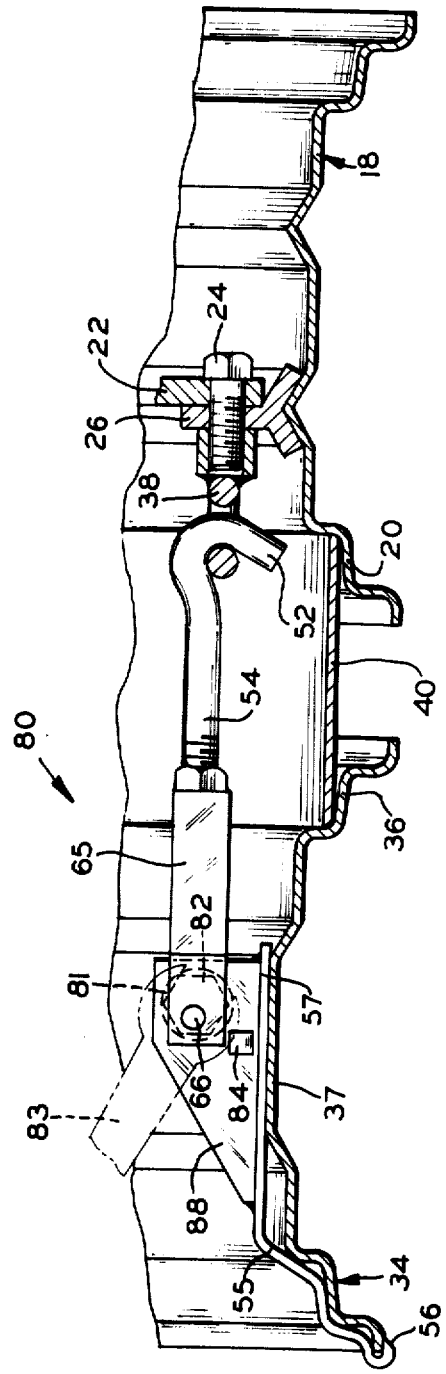

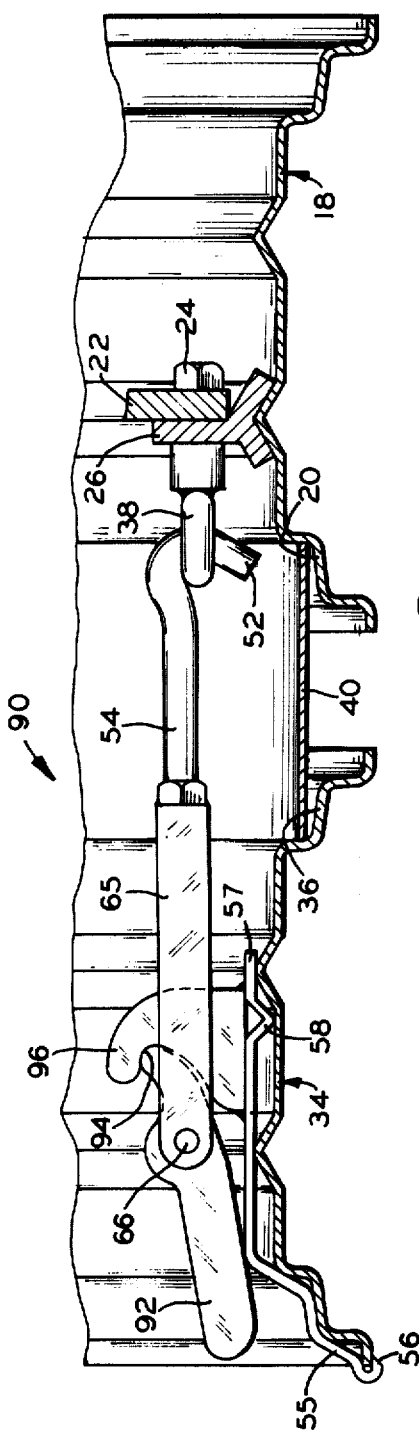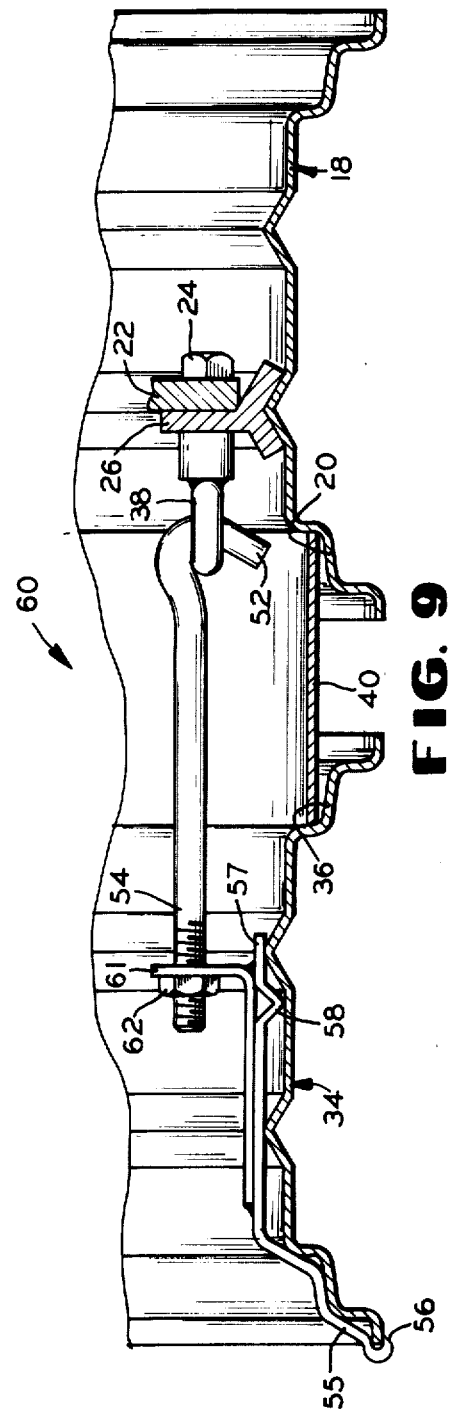

AUXILIARY WHEEL ATTACHING MEANS

BACKGROUND OF THE INVENTION

The advantages of dual wheels under certain types of conditions is well known. However, apparatus of this type which is currently available is complex from the standpoint of installation, modification of the auxiliary wheel rim, and is subject to continual maintenance. Also such apparatus is generally designed for a specific wheel mounting and is not universally adaptable for varying types of wheel designs.

SUMMARY OF THE INVENTION

Generally speaking, this invention deals with an apparatus for detachably mounting an auxiliary wheel coaxially to a vehicle wheel, such as on tractors and the like, wherein both wheels have cylindrical rims and each rim includes radially extending terminal flanges at each of their edges. A spacer ring between the wheels engages an offset portion on the flange on the auxiliary wheel rim and an offset portion on the adjacent opposed flange on the vehicle wheel rim. The vehicle wheel has adjacent its rim clamping lugs with hook engageable means attached thereto, such as by some of the stud bolts which connect it to a drive hub. The wheels are held together by a releasable clamp connecting device having a locked and unlocked position, which device comprises a first and a second hook means which may be interconnected by a link. The first hook means is engageable with the hook engageable means on the vehicle wheel and includes an adjustable threaded anchor means. The second hook means may be a strip means having a hook portion at one end which is engageable with the auxiliary rim outer terminal flange (which flange is remote from the vehicle wheel) and having near its other end a second anchor means, bridging a cylindrical center base portion of the auxiliary rim. The two anchor means may either be connected together directly or through a link which is longitudinally adjustably connected at one end to the first and threaded anchor means, and at its other end to the second anchor means by a toggle clamp. This toggle clamp may comprise an eccentric connection on a limitably rotatable disk, or an over-center lever.

OBJECTS OF THE INVENTION

Accordingly, it is an object of this invention to provide an improved mounting means which is universally applicable for all types of auxiliary wheels and which quickly attaches and detaches the auxiliary wheel rim to and from a vehicle.

Another object of this invention is to provide an improved mounting means which does not require any modification of or additional parts on the auxiliary wheel or its rim.

BRIEF DESCRIPTION OF THE DRAWINGS

The above mentioned and other features, objects and advantages and a manner of attaining them are described more specifically below by reference to embodiments of this invention shown in the accompanying drawings, wherein:

FIG. 1 is a schematic top plan view of a tractor employing detachable auxiliary traction wheels in accordance with this invention;

FIG. 2 is an enlarged side view of an auxiliary wheel of FIG. 1, showing the spacing of the releasable clamp connecting devices of one embodiment of this invention for attaching the auxiliary wheel to the traction wheel of the tractor;

FIG. 3 is a cross-sectional view taken substantially along line 3 — 3 of FIG. 2 showing a spacer and three of the releasable clamp connecting devices;

FIG. 4 is an enlarged view of one of the releasable clamp connecting devices shown in FIG. 3 with parts of the wheels broken away;

FIG. 5 is a top plan view of the releasable clamp connecting devices shown in FIG. 4 with only a part of the driving wheel shown;

FIG. 6 is an enlarged side view similar to FIG. 4 but of another embodiment of a releasable clamp connecting device of this invention, and showing another type of auxiliary wheel rim;

FIG. 7 is a top plan view of the releasable clamp connecting device shown in FIG. 6 with only a part of the driving wheel shown;

FIG. 8 is an enlarged side view similar to FIG. 4 of another embodiment of a releasable clamp connecting device of this invention, showing an over-center lever and fulcrum arrangement for locking and unlocking the device; and FIG. 9 is an enlarged side view similar to FIG. 4 of still another embodiment of a releasable clamp connecting device according to this invention, showing a threaded connector.

DESCRIPTION OF THE PREFERRED EMBODIMENTS

Referring to the drawings, particularly FIGS. 1 and 3, a tractor 10 is shown with a pair of regular rear traction drive wheels 12 and a pair of auxiliary traction wheels 14 attached thereto. Each of the regular wheels 12 includes a tire 16 mounted on a terminal radially extending flanged rim 18 having a cylindrical offset portion 20, and affixed to a driving hub 22 by a plurality of lug bolts 24 spaced uniformly around the inner periphery of a support flange 26 attached to the rim 18. A cylindrical portion of this rim 18 may be provided with a pair of axially spaced, radially inwardly projecting V-shaped strengthening ribs 19, one of which seats the support flange 26. The drive hub 22 may be affixed to a driving axle 28 by bolts 30 in a conventional manner.

The auxiliary traction wheel 14 also includes a tire 32 and a terminal flanged rim 34 having offset portions 36 and may be similar to the rim 18 except that no support flange is required for attachment to a driving hub. A cylindrical central base portion of this rim 34 may also be provided with a pair of axially spaced inwardly radially projecting V-shaped strengthening ribs 35, or this cylindrical base portion may be a single wide flat rib 37 as shown in FIG. 6.

Affixed to some of the lug bolts 24 (preferably at least three equally spaced bolts) on the vehicle wheel 12 (see FIG. 3), are a plurality of clamp lugs having hook engaging means or eye nuts 38. These hook engaging means 38 include projecting portions extending toward the auxiliary wheel 14 (see also FIGS. 4 through 9). Once the hook engaging means or eye nuts 38 are assembled with the lug bolts 24 on the regular wheel 12, they become a permanent part of the wheel 12 and need not be removed unless the rim 18 is to be taken from its hub 22.

An annular cylindrical spacer or mounting means or ring 40 may be disposed between the rims 18 and 34 when the auxiliary wheel 14 is attached to the vehicle wheel 12, with one edge of the ring abutting or seated in the offset portion 36 on the rim 34 and its other edge abutting or seated in the similar offset portion 20 on the rim 18. If desired, this spacer ring 40 may be welded to the auxiliary rim 34 to facilitate mounting of the auxiliary wheel to the vehicle wheel.

In FIGS. 4 through 9 a plurality of different embodiments of releasable clamp connecting devices 50, 60, 80, and 90, according to this invention, may be used to connect the wheels 12 and 14 to each other. Each of these connectors 50, 60, 80 or 90 includes two hook means; one hook means 52 which cooperates with the projecting portion of the hook engaging means 38 to effect the connection to the wheels 12. This hook 52 is provided with an anchor means, wuch as a threaded end 54. The other hook means 55 may comprise a flat strip means and has one end thereof shaped to substantially conform with the outside terminal flange contour of the auxiliary rim 34, and includes a hook portion 56 for cooperating therewith. This other hook means or strip means 55 also includes a flat bridging portion 57 which may have a transverse V-shaped rib 58 on its face adjacent the rim. This flat portion 57 extends parallel to the axle of the wheel, or the central cylindrical base portion of the auxiliary rim 34, to substantially overlie the axially spaced ribs 35 or the wide rib 37 (see FIG. 6) of the cylindrical base portion of the rim 34. The ribs 35 or 37, together with the ribs 58, support the flat bridging portion 57.

In the embodiment 60 shown in FIG. 9 the flange hook engaging or strip means 55 is provided with an upstanding anchoring means or bracket 61 near its other end from the hook portion 56, which anchoring means 61 has an opening therein for directly receiving the threaded end 54 of the hook 52. A nut 62 threaded on the end 54 projecting through the bracket 61 holds the rim 18 and 34 of the wheels 12 and 14, respectively, together. Also the threaded end 54 simultaneously adjusts the length of the clamp connecting device 60 to fit the distance between the hook engageable means 38 and the outside flange of the rim 34 of the auxiliary wheel.

In the toggle clamp embodiments 50, 80 and 90 shown in FIGS. 3 through 8, the end 54 threads into a bifurcated link 65, the ends of the legs of which bifurcated link 65 have openings therein to receive a pivot pin 66 of the toggle clamp. This threaded connection of the end 54 into the link 65 also permits longitudinal adjustment of the link 65 to compensate for different width spacers 40 and rims 34 so that the hooks of the toggle clamps between the hook engaging means 38 and the flange of rims 34 will operate tightly and thereby snugly hold the rims of the wheels 12 and 14 together.

This pivot pin 66 in the embodiments 50 (see FIGS. 4 and 5) and 80 (see FIGS. 6 and 7) also extends through openings eccentric of a circular cam 71 and a circular cam 81, respectively, disposed between the legs of the link 65.

In the embodiment of FIGS. 4 and 5, this pivot pin 66 also extends through openings in the ends of the legs of a movable bifurcated toggle lever 72, which ends extend adjacent and along each side of the circular cam 71 between the legs of the link 65. This circular cam 71 and the ends of the movable lever 72 have another set of aligned openings by means of which they are connected together by a locking or roll pin 74. Thus the cam 71 is secured to the lever 72 by the pivot pin 66 and the roll pin 74 for unitary movement therewith. An upstanding anchoring means or cam bracket 76, which is integrally secured such as by welding onto the face of the flat portion 57 opposite the rib 58, rotatably retains the cam 71 near the end of the bridging portion 57 opposite the hook end 56 of the strip means 55. The lever 72 may have a projection 73 which contacts the surface of the bridging portion 57 to limit or stop the movement of the lever 72 past its center to lock this toggle clamp.

In the embodiment 80 of FIGS. 6 and 7, the cylindrical cam member 81 is provided at its axial intermediate portion 82 with an irregular or hexagonal shape so that it can be rotated by a wrench 83 (shown in dotted lines) instead of a lever fixedly secured thereto as shown in the embodiment of FIGS. 5 and 6. This cam member 81 rotates in an upstanding anchoring means or U-shaped bracket 88 integrally secured to the bridging portion 57 of the strip means 55 near its end opposite that from the hook portion 56. This bracket 88 thus journals the round ends of the cam member 81 as well as limits or stops its rotation by a projection 84 from the side of the bracket which abuts against the edge of the link 65. This stop is located so that the rotatable cam member 81 has its pivot pin 66 in its over-center position to lock this toggle clamp.

In the embodiment 90 shown in FIG. 8, the pivot pin 66 extends through an opening intermediate the ends of a movable toggle lever 92 disposed between the legs of the link 65. An end of this toggle lever 92 is fulcrumed in a detent 94 in an anchoring means or bracket 96 affixed to the bridging portion 57 of the strip means 55 near its end opposite that from the hook portion 56. The pivot pin 66 and detent 94 are so located that when the toggle lever is stopped by contact with the edge of the surface of the bridging portion 57, it is in its over-center toggle clamp locking position.

The levers 72 and 92 and wrench 83 may be moved by means of an auxiliary lever (not shown), such as a pipe slipped over their outer ends to provide more leverage if required to move them into and from their locked and unlocked positions.

While there is described above the principles of this invention in connectic with specific apparatus, it is to be understood that these descriptions are made by way of examples and not as a limitation to the scope of the invention.

I claim:

1. In combination with a dual rim assembly of the type wherein an auxiliary rim is spaced by a cylindrical ring means from a main rim of a vehicle wheel having a plurality of clamp lugs with hook engaging means thereon, and said auxiliary rim includes inner and outer axially outwardly extending terminal rim edge flanges and therebetween a central base portion and a stepped portion including an axially extending tire bead seat flange, the improvement comprising at least three independent releasable and longitudinally adjustable connecting devices extending between and releasably engaging each hook engaging means and said auxiliary rim, each device comprising:

A. link means having a hook portion for attachment to one of said hook engaging means on the main vehicle wheel, B. a flat strip means bridging said axially extending tire bead seat flange and supported by and parallel to the central base portion of said auxiliary rim, said strip means having a hook portion at one end for removably engaging the outer axially extending terminal rim edge flange of said auxiliary rim, and C. adjustable means secured to said link means and engaging said flat strip means near its other end for varying the distance between said link means and said strip means.

2. In the combination of claim 1 wherein said link means includes a threaded means for adjusting its length.

3. In the combination of claim 1 wherein said hook engaging means comprises an eye nut.

4. In the combination of claim 1 wherein said strip means bridges the central base portion of said rim of said auxiliary wheel.

5. In combination with a dual rim assembly of the type wherein an auxiliary rim is spaced by a cylindrical ring means from a main rim of a vehicle wheel having a plurality of clamp lugs with hook engaging means thereon, and said auxiliary rim includes inner and outer axially outwardly extending terminal rim edge flanges and therebetween a central base portion and a stepped portion including an axially extending tire bead seat flange, the improvement comprising at least three independent releasable and longitudinally adjustable connecting devices extending between and releasably engaging each hook engaging means and said auxiliary rim, each device comprising:

A. link means having a hook portion for attachment to one of the hook engaging means on said main vehicle wheel, B. a hook means bridging said axially extending tire bead seat flange, being supported by the central base portion, and engaging the outer axially extending terminal rim edge flange of said auxiliary rim, and C. toggle clamp means secured to said link means and to said hook means for varying the distance between them.

6. In the combination of claim 5 wherein said link means includes a threaded means for adjusting its length.

7. In the combination of claim 5 wherein said toggle clamp means comprises: a lever means, a pivotal connection between said link means and said lever means; and said hook means comprises a bracket in which said lever means fulcrums.

8. In the combination of claim 7 wherein said toggle clamp means comprises: a bracket mounted on said hook means, a circular cam journalled in said bracket, an eccentric pin in said circular cam connected to said link means, and means for rotating said circular cam.

9. In the combination of claim 8 wherein said means for rotating said circular cam comprises a lever attached to said cam.

10. In the combination of claim 8 wherein said means for rotating said circular cam comprises wrench engaging surfaces on said cam.

11. In the combination of claim 7 wherein said toggle clamp means includes means on said hook means for limiting the over-center position of said toggle clamp means.

12. In the combination of claim 5 wherein said link means includes a birfurcated portion adjustably connected to said hook portion, and means for journalling said toggle clamp means between the bifurcations of said bifurcated portion.

13. In combination with a dual wheel assembly for a vehicle having a pair of wheels arranged in side-by-side coaxial relation, each wheel including a wheel rim, each wheel rim including a central base portion and a stepped portion including an axially extending tire bead seat flange and inner and outer axially outwardly extending terminal edge flanges integrally formed therewith, one of said wheel rims having a hub and including a plurality of hook engaging means, a mounting ring having first and second rim engaging portions axially engaging the surface of each inner rim flange, the improvement comprising at least three independent releasable and longitudinally adjustable devices extending between and releasably engaging the hook engaging means on the one wheel and the outer terminal edge flange on the rim of the other wheel for retaining the wheels in interlocked relationship, each device comprising:

A. a hook insertable at one end into said hook engaging means and being threaded at its other end, B. a U-shaped link having at one end a threaded opening receiving the threaded end of said hook and having a pivot hole in its other end, C. a mounting bracket bridging said axially extending tire bead seat flange, being supported by the central base portion, and having a hook portion for engaging the outer axially extending terminal rim edge flange of the rim of said other wheel, D. a rotatable member journalled in said mounting bracket having an eccentric opening therein, E. stop means on said mounting bracket for limiting the rotation of said rotatable member, F. pivot means in said eccentric opening and said pivot hole of said U-shaped link connecting said U-shaped link to said rotatable member, and G. means for rotating said rotatable member to an over-center locking position against said stop means.

* * * * *